July 31, 1956  J. E. TUSCHER  2,756,982
HYDRAULIC GOVERNOR
Filed March 27, 1951  3 Sheets-Sheet 1
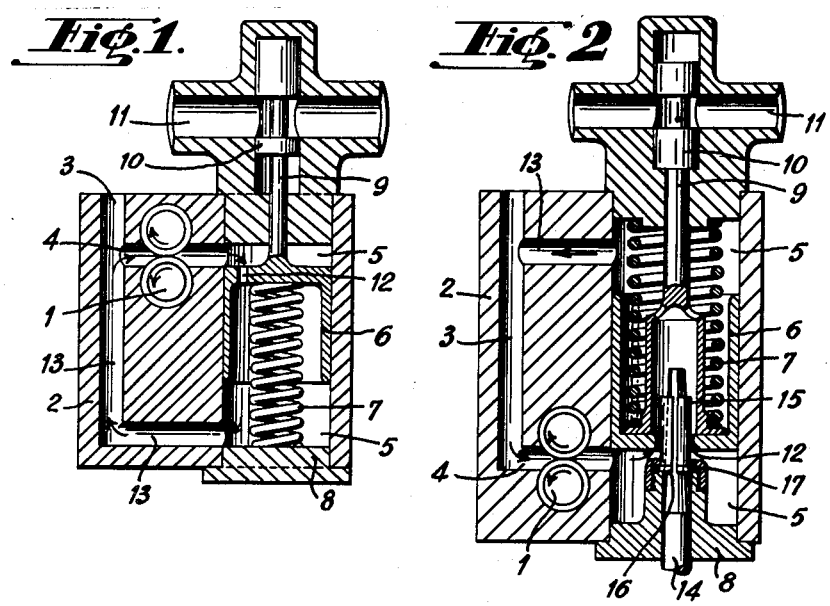
INVENTOR
JEAN EDOUARD
TUSCHER
ATTORNEYS July 31, 1956
J. E. TUSCHER
2,756,982
HYDRAULIC GOVERNOR
Filed March 27, 1951
3 Sheets-Sheet 2
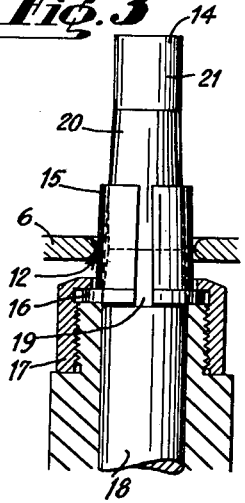
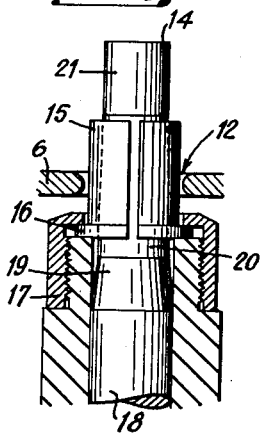
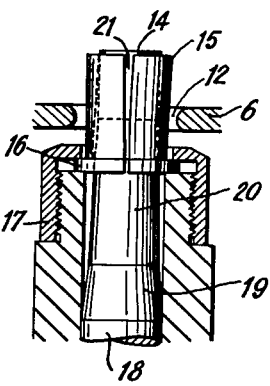
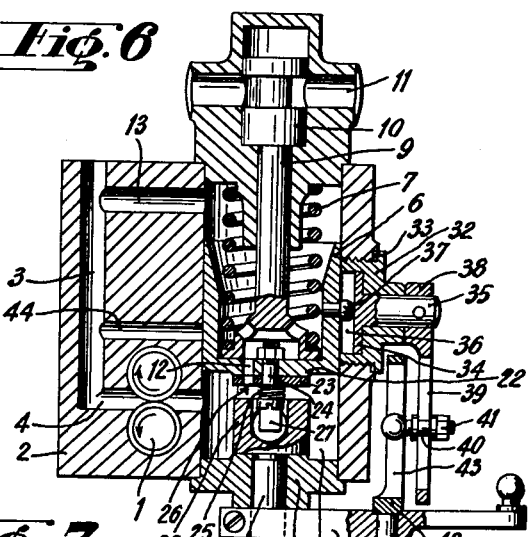
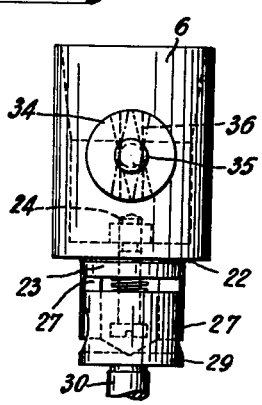
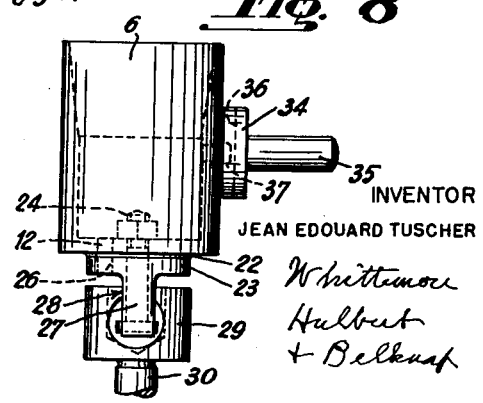
INVENTOR
JEAN EDOUARD TUSCHER
Whittemore
Hulbert
+ Belknap
ATTORNEYS

INVENTOR
JEAN EDOUARD TUSCHER

ATTORNEYS

United States Patent Office 2,756,982
Patented July 31, 1956

2,756,982

HYDRAULIC GOVERNOR

Jean Edouard Tuscher, Ivry-sur-Seine, France, assignor to Sebem S. A., Neuchatel, Switzerland, a corporation of Switzerland Application March 27, 1951, Serial No. 217,711

Claims priority, application Switzerland March 28, 1950

5 Claims. (Cl. 264—14)

The present invention relates to a hydraulic governor of the type comprising a volumetric pump driven by the engine to be regulated and working in a closed circuit, a movable piston in a chamber belonging to the said circuit, the portion of the said chamber lying on one side of the piston being connected to the admission of the pump, and the other to the outlet of the pump, a calibrated passage formed in a wall of the said chamber connecting the two above-mentioned portions of the chamber one with the other and dimensioned to produce a pressure drop of the fluid in the above-mentioned circuit, a spring acting on the piston in the opposite direction to the fluid in the chamber and means connecting the piston to a feed control member for the engine to be regulated, characterized in that it is provided with means for adjusting the section of the said calibrated passage.

The accompanying drawing shows, by way of example, a governor of known principle upon which is based the invention, as well as two embodiments of the governor which is the object of the invention, together with operation diagrams.

Fig. 1 is a diagrammatic section explaining the operation of a known governor, which is designed for the regulation of a constant speed and varying load engine.

Fig. 2 is a diagrammatic section of the first embodiment, which is designed for the regulation of a variable speed and varying load traction engine.

Figs. 3, 4 and 5 show, on a larger scale, a detail view of a modification of the embodiment according to Fig. 2, showing the members in three different positions.

Fig. 6 is a diagrammatic section of the third embodiment, which is also designed for the regulation of a variable speed and varying load traction engine.

Figs. 7 and 8 are detail views, on a larger scale, relative to the said second embodiment.

In these figures, the same reference numbers designate the corresponding members of the various governors shown.

Figure 9:
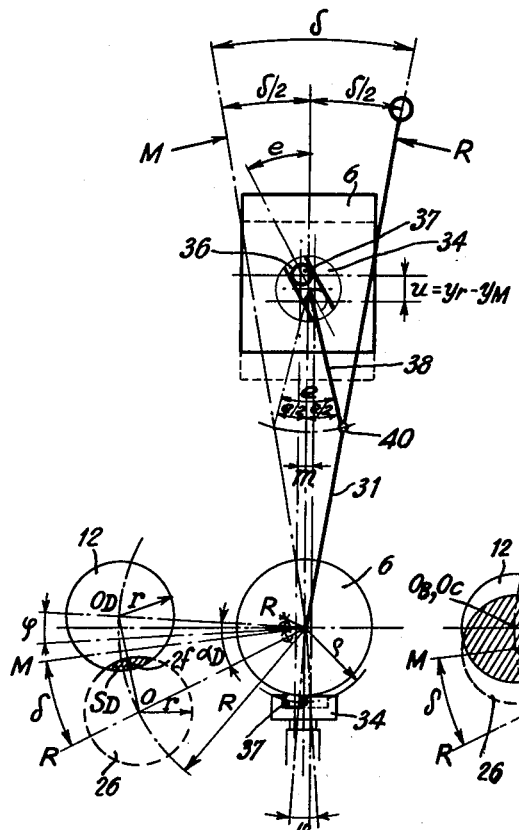
Figs. 9 to 12 show diagrammatically the various members of the governor according to Figs. 6 to 8, in various positions which they may assume.

The known governor shown in Fig. 1 will be described in order to explain the principle upon which is based the invention. It includes a volumetric pump 1, for example a gear-pump, housed in a frame 2, driven by the engine to be regulated, not shown, which, in the present example, may be any gas or steam engine or a hydraulic engine which must operate at constant speed and under varying loads. Oil, for example, is led through conduits 3 and 4 to the admission of the pump. The pump drives the oil into a cylindrical chamber 5 provided in the frame 2 and in which slides a piston 6. The piston is subjected to the thrust of a spring 7 bearing on one of the bases 8 of the chamber 5. This piston is provided with a rod 9 controlling a feed member for the engine, constituted in the present case by a valve 10 itself controlling the passage of the fluid in a conduit 11 leading to the engine. At the head of the piston is formed a calibrated passage 12 establishing communication between the two faces of the said head and through which passes the oil supplied by the pump. The oil returns to the pump by a conduit 13 communicating with the conduit 3. The latter is in communication with an oil reservoir, not shown.

The governor is shown in the starting position of the engine, in which the feed valve 10 of the latter is fully open. When the engine is started up (by means not shown), it drives the pump 1 in synchronism with itself. The latter must reach a certain speed before the pressure on the piston is sufficient to overcome the initial thrust of the spring 7. When the speed allowed by the calibrated passage 12 has been reached, the pressure on the piston 6 lowers the latter which, through the agency of the rod 9, reduces the section of the passage of the valve 10. The section of the calibrated passage 12 is such that a stable equilibrium of the governor is reached for all possible positions of the piston 6 between two specified speeds of the engine, as will be seen hereafter. It is obvious that a reduction in the load of the engine tends to produce an increase in its speed, and thus in the speed of the pump 1. The pressure on the piston increases and the latter, in moving downwards, reduces the section of the passage of the valve 10 controlling the engine feed. Inversely, an increase in the engine load tends to reduce its speed, thus reducing the pressure on the piston 6. The latter rises again under the action of the spring 7, thus increasing the opening of the section of the passage of the valve 10.

Fig. 2 shows an embodiment of my improved regulator. It includes, as in the case of the governor of Fig. 1, a gear-pump 1 driven by the engine to be regulated, a frame 2, conduits 3 and 4 leading oil to the admission to the pump 1, a cylindrical chamber 5 in the frame 2, a piston 6 and its spring 7, the latter bearing against the wall closing the chamber 5 at its upper portion, a rod 9 integral with the piston 6 and controlling a valve 10, which itself controls the passage of the fluid feeding the engine through the conduit 11. In the head of the piston 6 is formed a calibrated axial hole 12 establishing communication between the two faces of the said head and through which passes the oil supplied by the pump. The oil returns to the pump through the conduit 13 communicating with the conduit 3. The latter is in communication with an oil reservoir, not shown. The governor moreover includes a needle 14 integral with the accelerator (not shown) of the engine. The needle 14 is capable of sliding in one of the bases 8 of the chamber 5 and terminates in a conical free end on which is mounted an expansible sleeve 15. The latter is formed by a split ring having an outer surface of a general cylindrical shape and a conical inner surface having the same conicity as the needle 14. The sleeve is held at its lower portion by a flange 16 co-operating with a member 17 integral with the frame, so that the sleeve cannot move in an axial direction. The sleeve 15 co-operates with the axial hole 12 pierced in the head of the piston 6. According to the position given to the needle 14, the sleeve 15 is more or less withdrawn. It is thus possible to vary the section S of the annular calibrated passage formed by the space included between the hole 12 and the sleeve 15, the said section being capable of assuming all possible values between a minimum section corresponding to the stopping or slow speed of the engine, and a maximum section corresponding to the maximum speed limit.

In the above device, the section S of the calibrated passage, once determined by the position of the needle 14, remains constant whatever the position of the piston 6 relative to the sleeve 15, since the outer surface of the latter has a general cylindrical shape. If the engine to be regulated requires different degrees of irregularity according to the working speeds, the free end of the needle 14 will be given the shape shown in Figs. 3 to 5. In this case, the needle 14 comprises a cylindrical portion 18 sliding in the base 8 of the chamber 5, a first conical portion 19, a second conical portion 20, the conicity of which is less stressed than that of the first portion 19, finally a last cylindrical portion 21. When the needle 14 is in the position shown in Fig. 3, the sleeve 15 presents a conical outer surface, of a diameter decreasing from bottom to top. According to the variation in the resistant couple, for a speed determined by the section of the calibrated passage, the piston 6 moves relatively to the sleeve 15. For a reduction in the resistant couple, the speed increases, the piston 6 moves upwardly, the section S of the calibrated passage increases, and the degree of irregularity increases. Fig. 4 corresponds to the case of Fig. 2, that is to say that in such a case, the section S of the calibrated passage does not vary for all the positions of the piston 6, and the degree of irregularity is given naturally by the spring 7. If finally the needle is in the position shown in Fig. 5, the sleeve 15 presents a conical outer surface of increasing diameter from the bottom to the top. When the piston 6 moves upwardly, the section S of the calibrated passage decreases and the degree of irregularity is reduced.

The equilibrium of the governor will be unaffected when, for a determined conicity of the sleeve 15 according to Fig. 5, the degree of irregularity will be equal to zero. The parabolic segments of the speeds $n$ will then be replaced by straight segments parallel to the axis of pressures, whereas in the parabolic segments will be replaced by straight segments parallel to the $y$ axis.

If the conicity of the sleeve 15 according to Fig. 5 is still higher, the degree of irregularity is reversed (negative) and the regulation again occurs from all to zero, starting taking place with the valve 10 in the maximum open position of the conduit 11. In the case of a negative degree of irregularity, all the possible positions of the governor are equally stable.

The governor shown in Fig. 6 is also designed for the regulation of a traction engine, and it allows of varying the degree of irregularity of the apparatus without altering the characteristics of the spring. It includes a gear-pump 1 driven by the engine to be regulated, a frame 2, conduits 3 and 4 leading oil to the admission of the pump 1, a cylindrical chamber 5 in the frame 2, a piston 6 sliding in the said chamber and subjected to the action of a spring 7 bearing against the wall enclosing the chamber 5 (at its upper portion on the drawing), a rod 9 integral with the piston 6 and controlling a valve 10, which itself controls the passage of the fluid feeding the engine through the conduit 11. In the head of the piston is formed a calibrated hole 12, at a certain distance from the axis of the piston, establishing communication between the two faces of the said head and through which passes the oil supplied by the pump. The oil returns to the pump through a conduit 13 communicating with the conduit 3. The latter is in communication with an oil reservoir, not shown.

The piston 6 presents a central shoulder 22 on which is mounted a shutter 23 capable of turning about a pivot 24 axially traversing the head of the piston 6. A spring 25, mounted on the pivot 24, presses the shutter 23 against the shoulder 22 of the piston. The shutter 23 is pierced with a hole 26 of the same diameter as the hole 12, the two holes being in exact register in one of the positions which may be assumed by the shutter 23. The latter is provided with an extension 27 in the shape of a fork which may slide, when the piston 6 moves in the chamber 5, in a slot 28 (Fig. 8) of a bloc 29 integral with an axis 30 capable of rotating in a member 8 forming the lower base of the chamber 5. At the lower end of the axis 30 is mounted a control handle 31. By rotating the handle in its plane, the shutter 23 is made to rotate relative to the head of the piston 6, through the agency of the axis 30, of the block 29 and of the extension 27 of the shutter co-operating with the edges of the slot 28. It is thus possible to modify the section of the calibrated passage formed by the holes 12 and 26.

A stopper 32 is secured in a recess provided in the side wall of the chamber 5, a joint 33 ensuring tightness. The stopper 32 is provided with a cylindrical cavity in which is housed a cylindrical member 34, integral with a shaft 35, capable of rotating in the stopper 32. The member 34 is provided with a straight groove 36 arranged according to one of its diameters, and in which may move, without appreciable play, an eye-bolt 37 secured to the side wall of the piston 6. At the end of the shaft 35, co-axial with the member 34, is secured a lever 38 having a slot 39, along with may slip an eye-bolt 40 which may be immobilized at will in a determined position, by screwing down the lever 38, by means of a nut 41. The head of the eye-bolt 40 co-operates with a member 42 mounted on the handle 31, the said head being housed, without appreciable play, in a slot 43 in the member 42.

When the handle 31 is moved to vary the section of the calibrated passage 12, 26, as has been seen above, there is produced at the same time a rotation of the shaft 35, and the inclination of the slot 36 is thus varied relative to a generating line of the piston 6. When the piston moves in the chamber 5 in order to take up a new position of equilibrium, following upon a variation in the resistant couple, for a speed determined by the handle 31, the eye-bolt 37 of the piston 6, which is obliged to follow the groove 36, forces the piston to rotate about its own axis relative to the shutter 23, the direction of this rotation depending on the direction of inclination of the groove 36 (see Fig. 7). If this inclination is such that it brings about, for a determined position of the handle 31, an increase in the section of the calibrated orifice 12, 26, during the stroke of the piston from all to zero for the valve 10, the degree of irregularity will be increased, and inversely. The variation of the degree of irregularity may be regulated at will by moving the eye-bolt 40 in the slot 39 of the lever 38. It will be seen from Fig. 6 that rotation through a given angle of the handle 31 produces a rotation of the axis 35 and, consequently, of the slot 36, which is all the greater as the eye-bolt 40 is secured nearer to the shaft 35.

When the handle 31 is placed abruptly in the position of rest, which reduces to zero the section of the calibrated passage 12, 26, the piston 6 is very rapidly pushed back upwardly into the closing position of the valve 10, and the pressure exerted against the piston by the oil supplied by the pump 1 might rise to a dangerous extent. In order to avoid excess of pressure, there is provided in the frame 2, a discharge conduit 44 arranged so as to connect the outlet and the admission of the pump 1 one with the other when the piston 6 completely closes the valve 10.

Figure 11:
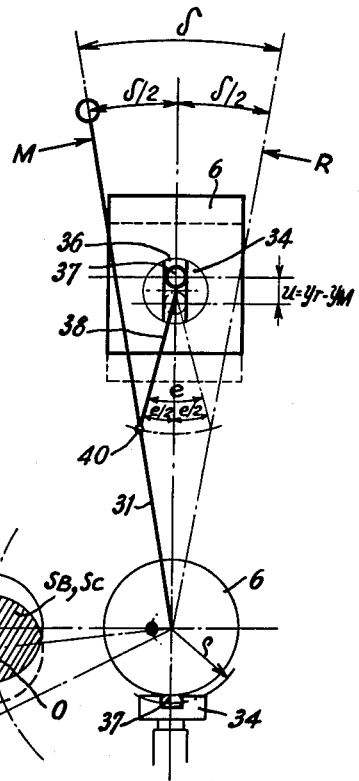
Figure 10:
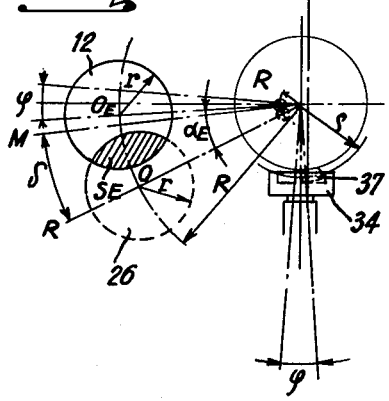
Figure 12:
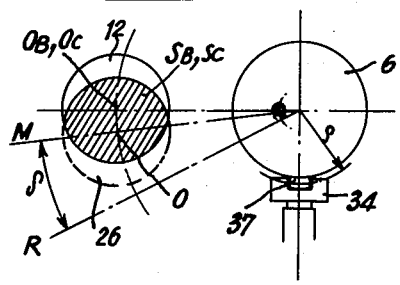

We shall examine in fuller detail the operation of the said regulator (see Figs. 9 to 12).

When it is a matter of regulating a traction engine, the degree of irregularity required by the engine at its different working speeds depends not only on the inertia of the mass in rotation, but also on the output characteristics of the admission valve or of the feed pump when it is a question of a combustion engine. The stability of the governor at slow speed of the engine requires a speed of movement of the regulating piston greatly inferior to that suited to the limiting speed. In order words, the speed of movement of the regulating piston must always be substantially proportional to the speed of variation in the working speed of the engine upon variation in the resistant couple.

In fact, if the reaction speed of the regulator is greater than that of the engine, the regulating piston oversteps the position of equilibrium corresponding to the new resistant couple, and the piston oscillates about this position of equilibrium according to a sustained swinging movement.

Up to the present, one contended with this swinging movement by means of control mechanisms and dash-pots placed between the governor and the admission valve. These means are costly and cumbersome, and if they permit of solving the regulation of constant speed and varying load engines, they become greatly complicated when it is a question of regulating a traction engine.

The solution proposed here is independent of all control or similar mechanism, since it permits, for example, of varying the degree of irregularity in terms of the working speed in consideration, in such a way that at the slow speed of a traction engine, the complete stroke of the regulating piston occurs over a large difference of working speed, whereas at the maximum speed limit, the break from all to zero takes place for a difference of minimum speed.

We have seen that the position of the handle 31 (actuated by the accelerator) determines a working speed for a section S of the calibrated passage, and that the degree of irregularity given by the characteristics of the return spring 7 is constant at all working speeds when the said section S does not vary during the regulating stroke of the piston.

Consequently, by varying the section of the passage S by a more or less high rotation of the piston during its regulating stroke, in terms of the working speed determined by the said section, that is to say in terms of the position of the accelerator, the stability of the regulator will be realized for all working speeds, whatever the inertia of the masses in rotation of the engine and the output characteristics of the admission valve or of the fuel pump.

As a general rule:

(1) The stability of the governor at a reduced speed of the engine requires a speed of movement of the regulating piston much lower than that suited to the limiting speed. The degree of irregularity must therefore diminish from the reduced speed to the limiting speed of a traction engine.

(2) For any section S of the calibrated passage, that is to say for a speed of rotation determined by the position of the accelerator, the degree of irregularity $\epsilon$ is defined by the expression:

$$\epsilon = \frac{n_2 - n_1}{0.5(n_2 + n_1)}$$

where $n_1$ is the speed of rotation of the pump in the position "all" of the regulating piston, and $n_2$ the speed of rotation of the pump in the position "zero" of the regulating piston. This expression allows of obtaining $n_2$ in terms of $n_1$:

$$n_2 = n_1 \frac{2+\epsilon}{2-\epsilon}$$

in which the degree of irregularity $\epsilon$ is expressed in per cent (5%=0.05, 10%=0.10, 20%=0.20, etc.).

(3) We have previously seen that for a spring of initial thrust $a$ and rigidity $b$, and for a stroke of the regulating piston $y$ between any two limiting positions included between the positions "all" and "zero," one has for each of the possible sections of the calibrated passage:

The same pressure $p_1$ and the same discharge speed $V_1$ at the level of the calibrated passage when the regulator is in the limiting position next to the position "all";

The same pressure $p_2$ and the same discharge speed $V_2$ at the level of the calibrated passage when the governor is in the limiting position next to the position "zero";

A speed difference $\Delta n = n_2 - n_1$ of the pump between the two considered limiting positions, which corresponds to a constant degree of irregularity, whatever the section S of the calibrated passage, that is to say whatever the working speed of the engine.

We shall consider, by way of example (Figs. 9 to 12) how to determine the characteristics of the governor in the case of a four-stroke traction engine, whose throttled speed must be 400 R. P. M. and the limiting or maximum speed 2400 R. P. M. The gear ratio between the engine and the pump of the regulator being 2:1 (four-stroke engine), the pump will have a rotational speed $n$ of 200 R. P. M. at the throttle and 1200 R. P. M. at the maximum. The condition will also be laid down that the degree of irregularity $\epsilon$ be 50% at reduced speed and 5% at the maximum speed, $\epsilon$ varying linearly with $n$ between these two limits. Finally, $\epsilon$ remains constant and equal to 50% when the engine is stopped, that is to say when $n$ varies from 200 R. P. M. to zero.

In the case of the regulation of constant speed and varying load engines, practice has shown that it was preferable for such engines to provide the regulation of the section of passage S in order to allow of obtaining exactly the desired rotational speed $n$.

Similarly, in order to be free of any problem of control between the governor and the auxiliary controls and of the use of dash-pots with a view to stabilizing the regulation, it is advantageous to regulate the degree of irregularity according to the requirements of the engine and its working speed without even changing the characteristics $a$ and $b$ of the return spring of the piston 6. To this end, it is sufficient to impart a tacking movement to the piston 6 by means of the groove 36, the adjustable inclination of which allows of varying, at will, the degree of irregularity.

It should be noted that:

(1) The section S of the calibrated passage corresponding to the required speed is regulated by the shutter 23.

(2) The inclination of the groove 36 will then be regulated in order to discover exactly the two speeds $n_1$ (all) and $n_2$ (zero) which correspond to the degree of irregularity sought after.

(3) The degree of irregularity is defined, as has been seen, by:

$$\epsilon = \frac{n_2 - n_1}{0.5(n_1 + n_2)}$$

(4) When $n_2$ is smaller than $n$, the degree of irregularity is negative, as in the case asynchronous alternators for example, the speed on load is then greater than that when running light.

(5) Any return spring 7 always gives a positive degree of irregularity when the section S remains constant during the whole stroke of the piston.

This degree of irregularity diminishes when the initial thrust $a$ of the spring increases; diminishes when the rigidity $b$ of the spring is less.

(6) By rotating the member 34 carrying the groove 36 in the direction of the reduction of the degree of irregularity, when $n_2 - n_1 = 0$, the equilibrium of the regulator is unaffected and no regulation of the engine can be realized.

By rotating this member still further, $n_2$ the becomes smaller than $n_1$ which means that $S_2$ "zero" is smaller than $S_1$ "all." The degree of irregularity is then negative and all the positions of the governor are again stable.

(7) The degree of irregularity must be either positive or negative but cannot be positive in one part of the regulation of the stroke of the piston 6 and negative in the other.

It will be observed that, in the examples described, the regulation occurs, contrarily to custom, from "all" to "zero." When the engine is at rest, the feed is at a maximum. This may seen paradoxical at first sight but corresponds exactly to the requirements of the engine which, upon starting, requires massive admission. Upon starting up of the engine, the action of the governor comes into play by reducing the output given by the position "all," in order to regulate its working speed according to the position of the accelerator. In the case of diesel engines, since the pump of the regulator is used as a feed pump for the injection pump, no accident can occur. Should a rupture of the regulator occur, the engine would come to rest.

What I claim is:

1. In an automatic governor for motors also provided with manually operable control means, said governors being of the type including a positive displacement pump driven by said motor in constant ratio to the speed thereof, a closed circuit for the fluid propelled by said pump and means operated by the fluid in said circuit controlling said motor; a cylinder included in said circuit having spaced inlet and outlet connections therewith, a piston in said cylinder between said connections operatively connected to said motor controlling means, said piston having a restricted fluid passage therethrough for effecting a drop in pressure at the outlet end and thereby unbalancing the pressures on opposite ends of said piston, resilient means biasing said piston to move counter to the movement by differential fluid pressure thereon, and means responsive to any adjustment of said manually operable control means for varying the restriction of said passage through the piston and thereby varying the effective pressures on said piston whereby the latter and the motor control means connected therewith will be shifted in position.

2. The construction as in claim 1 in which the means for varying the restriction of the passage through the piston includes an obstructing member extending within said passage which is alternatively radially expansible and contractible in response to adjustment of said manually operable control means.

3. The construction as in claim 2 in which the member extending within said passage includes a sectional sleeve and a member moveable axially within said sleeve to radially expand or contract the same in response to adjustment of said manually operable member.

4. The construction as in claim 1 in which said piston has attached thereto a shutter member having an aperture therethrough in partial registration with said restricted passage and said means responsive to adjustment of said manually operable means moves said shutter to change the degree of registration of said aperture and to thereby vary the restriction of the passage.

5. In an automatic governor for motors also provided with manually operable control means, said governor being of the type including a positive displacement pump driven by said motor in constant ratio to the speed thereof, a closed circuit for the fluid propelled by said pump, a cylinder included in said circuit having an inlet connected to the outlet of said pump and an outlet connected to the admission of said pump, a piston movable between said inlet and said outlet of said cylinder and separating it into two chambers, said piston being operatively connected to a feed control member for the motor to be regulated and having a restricted fluid passage in its head for effecting a drop in pressure in said fluid circuit, a spring opposing the movement of said piston by fluid pressure, and means actuated by said manually controlled means for varying the restriction of said fluid restricted passage in different positions of said piston within said cylinder and additional adjustment means for varying the degree of variation in said positions.

References Cited in the file of this patent

UNITED STATES PATENTS

| | | |
|---|---|---|
| 1,012,025 | Stier | Dec. 19, 1911 |
| 1,268,421 | Balough | June 4, 1918 |
| 1,958,410 | Schaeren | May 15, 1934 |
| 2,293,814 | Garrett | Aug. 25, 1942 |
| 2,481,334 | Nicolls | Sept. 6, 1949 |
| 2,566,728 | Kemp | Sept. 4, 1951 |
| 2,567,495 | Nicolls | Sept. 11, 1951 |